(12) United States Patent
Sawai (10) Patent No.: US 8,279,819 B2
(45) Date of Patent: Oct. 2, 2012

(54) WIRELESS COMMUNICATION METHOD

(75) Inventor: Ryou Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 12/554,458

(22) Filed: Sep. 4, 2009

(65) Prior Publication Data

US 2010/0091711 A1    Apr. 15, 2010

(30) Foreign Application Priority Data

Oct. 10, 2008    (JP) ................................. 2008-264566

(51) Int. Cl.
*H04W 4/00* (2009.01)
(52) U.S. Cl. .................... 370/329; 370/338; 370/341
(58) Field of Classification Search .................. None
See application file for complete search history.

(56) References Cited

U.S. PATENT DOCUMENTS

| | | | |
|---|---|---|---|
| 2002/0059434 | A1 | 5/2002 | Karaoguz et al. |
| 2007/0019672 | A1 | 1/2007 | Guthrie |
| 2008/0112474 | A1* | 5/2008 | Refaeli ................ 375/222 |
| 2008/0297366 | A1* | 12/2008 | Hsieh et al. ............. 340/686.1 |
| 2009/0011770 | A1* | 1/2009 | Jung et al. ................ 455/452.1 |
| 2009/0098824 | A1* | 4/2009 | Rofougaran et al. ........ 455/13.1 |
| 2009/0111582 | A1* | 4/2009 | Schuler et al. ............ 463/42 |

FOREIGN PATENT DOCUMENTS

| | | |
|---|---|---|
| JP | 8-213921 | 8/1996 |
| JP | 2006-86868 | 3/2006 |
| JP | 2007-504695 | 3/2007 |
| JP | 2007-189301 | 7/2007 |
| JP | 2008-172588 | 7/2008 |
| WO | WO 2008/090524 A2 | 7/2008 |
| WO | WO 2008/090524 A3 | 7/2008 |

OTHER PUBLICATIONS

Japanese Office Action issued Oct. 5, 2010, in Patent Application No. 2008-264566.

* cited by examiner

*Primary Examiner* — Chi Pham
*Assistant Examiner* — Soon-Dong D Hyun
(74) *Attorney, Agent, or Firm* — Oblon, Spivak, McClelland, Maier & Neustadt, L.L.P.

(57) ABSTRACT

A wireless communication method is provided which includes the steps of selecting, by a wireless communication device belonging to a communication system operating on a certain communication protocol, a communication protocol among a plurality of communication protocols, exchanging, among a plurality of wireless communication devices including the wireless communication device, information including peripheral communication status of each wireless communication device by using the selected communication protocol, and changing the communication protocol to be used for exchanging the information.

14 Claims, 10 Drawing Sheets

WIRELESS COMMUNICATION METHOD

BACKGROUND OF THE INVENTION

1. Field of the Invention

The present invention relates to a wireless communication method.

2. Description of the Related Art

When using, depending on the using status of a spectrum for primary use (for example, frequency band for a digital TV broadcasting in the USA), the spectrum for primary use for a secondary service (for example, data communication by using the frequency band for a digital TV broadcasting in the USA according to a communication mechanism defined in IEEE 802.22), a wireless communication device has to detect the status of a spectrum used in the periphery so as not to interfere with the primary service, and has to perform communication in such a way that there is no competition with other communication. At this time, if the wireless communication device performs communication on its own judgment by using the communication status that the wireless communication device detected, problems occur, such as a so-called hidden terminal, shadowing, and the like. On the other hand, according to a decentralized detection technique of a plurality of wireless communication devices detecting the peripheral communication status and exchanging, among the plurality of wireless communication devices, the communication status, the above described problems can be alleviated. Also, in recent years, wireless communication devices are widespread which can communicate in ad-hoc mode by a plurality of communication protocols.

SUMMARY OF THE INVENTION

However, a case has not been considered as to which communication protocol is to be selected in the above-described decentralized detection technique when each of a plurality of wireless communication devices belongs to a separate communication system operating on a certain communication protocol.

In light of the foregoing, it is desirable to provide a novel and improved wireless communication method enabling, at the time of a plurality of wireless communication devices sharing in cooperation with each other information on peripheral communication status, the plurality of wireless communication devices to exchange the information among them by selectively using a communication protocol among a plurality of wireless communication protocols that can be used.

According to an embodiment of the present invention, there is provided a wireless communication method which includes the steps of selecting, by a wireless communication device belonging to a communication system operating on a certain communication protocol, a communication protocol among a plurality of communication protocols, exchanging, among a plurality of wireless communication devices including the wireless communication device, information including peripheral communication status of each wireless communication device by using the selected communication protocol, and changing the communication protocol to be used for exchanging the information.

The plurality of communication protocols may include an autonomous decentralized communication protocol and a hierarchical management communication protocol.

The autonomous decentralized communication protocol may be selected when immediacy of response to a change in a network configuration is required, and the hierarchical management communication protocol may be selected when immediacy of response to a change in a network configuration is not required and when a terminal acting as a coordinator exists.

The communication protocol to be used for exchanging the information may be changed to the hierarchical management communication protocol when the communication protocol used for exchanging the information is the autonomous decentralized communication protocol, another terminal acting as a coordinator exists and remaining power of the wireless communication device becomes lower than a predetermined value.

The autonomous decentralized communication protocol may be unconditionally selected at a time of first selecting the communication protocol.

The hierarchical management communication protocol may be unconditionally selected at a time of first selecting the communication protocol.

The communication protocol to be used for exchanging the information may be changed to the autonomous decentralized communication protocol when a terminal acting as a coordinator does not exist on the hierarchical management communication protocol.

The hierarchical management communication protocol may be selected when density of the plurality of wireless communication devices in a network in which the information is exchanged is higher than a predetermined value, and the autonomous decentralized communication protocol may be selected when the density is less than the predetermined value.

The communication protocol to be used for exchanging the information may be changed to the hierarchical management communication protocol when a terminal acting as a coordinator is detected while using the autonomous decentralized communication protocol.

When change from the autonomous decentralized communication protocol to the hierarchical management communication protocol is requested by a certain wireless communication device, peripheral devices working in cooperation with each other or the wireless communication device that issued the request for change working alone may check whether or not a peripheral device acting as a virtual base station or as a virtual access point exists, and when the peripheral device exists, may negotiate with the peripheral device to be a coordinator in its connection form, and if accepted, may shift to the hierarchical management communication protocol.

When a plurality of peripheral devices acting as virtual base stations or as virtual access points exist, a peripheral device capable of connecting to as many different base stations or access points as possible may be made to be a candidate for the coordinator in its connection form.

When the peripheral device acting as a virtual base station or as a virtual access point does not exist, a peripheral device to be the candidate may be searched for or the candidate for the coordinator may be selected by an arbitrary selection measure and a negotiation may be conducted between each other for the candidate to be the coordinator, and if permission is obtained, the communication protocol may be shifted to the hierarchical management communication protocol.

The autonomous decentralized communication protocol may include a communication protocol defined in WiMedia or in IEEE 802.11s, and the hierarchical management communication protocol may include Zigbee.

According to the embodiments of the present invention described above, peripheral communication statuses of a plurality of wireless communication devices can be exchanged among the plurality of wireless communication devices by

DETAILED DESCRIPTION OF THE INVENTION

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Furthermore, the "DETAILED DESCRIPTION OF THE INVENTION" will be described in the order shown below.

1. Concrete Example of Communication Protocol
<Hierarchical Management Communication Protocol>
<Autonomous Decentralized Communication Protocol>
<List of Properties>
2. Background
3. Overall Configuration of Present Embodiment
4. Configuration of Wireless Communication Device according to Present Embodiment
5. Operation of Present Embodiment
6. Other Application Examples of Present Embodiment
7. Conclusion and Supplement

1. CONCRETE EXAMPLE OF COMMUNICATION PROTOCOL

First, before describing a present embodiment, an example of a communication protocol will be described.

First, a communication protocol is broadly divided into a hierarchical management communication protocol (centralized protocol) and an autonomous decentralized communication protocol (de-centralized protocol).

<Hierarchical Management Communication Protocol>

In the hierarchical management communication protocol, one wireless communication device functions as a coordinator and other wireless communication device functions as a non-coordinator. In the hierarchical management communication protocol, a wireless communication device acting as a coordinator manages the communication of a non-coordinator.

Furthermore, the hierarchical management communication protocol may be Zigbee, for example. A flow of communication by Zigbee will be described with reference to FIG. 1.

Figure 1:
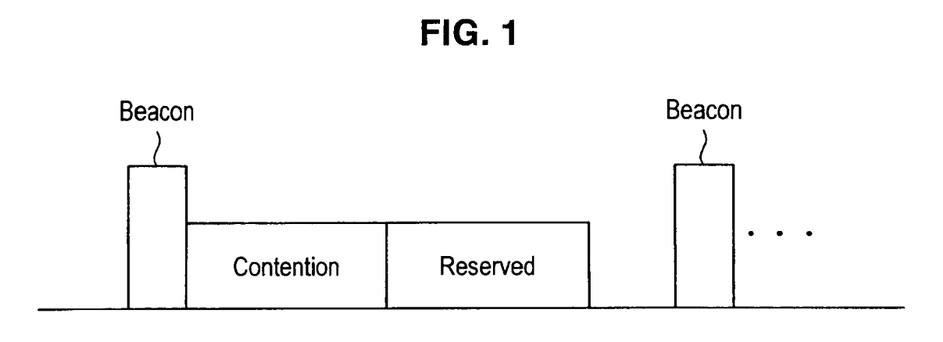
FIG. 1 is an explanatory diagram showing a flow of communication by Zigbee.

FIG. 1 is an explanatory diagram showing a flow of communication by Zigbee. As shown in FIG. 1, according to Zigbee, first, a transmission period for beacons by a coordinator arrives, and then a contention period arrives during which a non-coordinator performs communication by random backoff. Subsequently, a reserved period reserved for communication by a specific non-coordinator arrives.

Moreover, according to Zigbee, whether to function as a coordinator or as a non-coordinator is preset in each wireless communication device.

<Autonomous Decentralized Communication Protocol>

On the other hand, there is no master-slave relationship between wireless communication devices in the autonomous decentralized communication protocol, and each wireless communication device manages communication in an autonomous and decentralized manner.

The autonomous decentralized communication protocol may be a communication protocol defined in the Institute of Electrical and Electronic Engineers (IEEE) 802.11s, WiMedia, or the like, for example.

The communication protocol defined in IEEE 802.11s adopts an autonomous decentralized system according to Carrier Sense Multiple Access with Collision Avoidance (CSMA-CA).

Furthermore, according to the communication protocol defined in IEEE 802.11s, each wireless communication device transmits beacons at a predetermined period at any timing, and memorizes the difference between the beacon timing of a peripheral device and the beacon timing of itself. Furthermore, to deal with clock drift based on a shift of a sampling frequency, the wireless communication device matches the beacon period of itself to the beacon period longest among the peripheral devices. Furthermore, to avoid collision between beacons, the wireless communication device adds a collection list to a beacon and transmits the same.

On the other hand, WiMedia adopts an autonomous decentralized system based on Time Division Multiple Access (TDMA). In the following, a flow of communication by WiMedia will be described with reference to FIG. 2.

Figure 2:
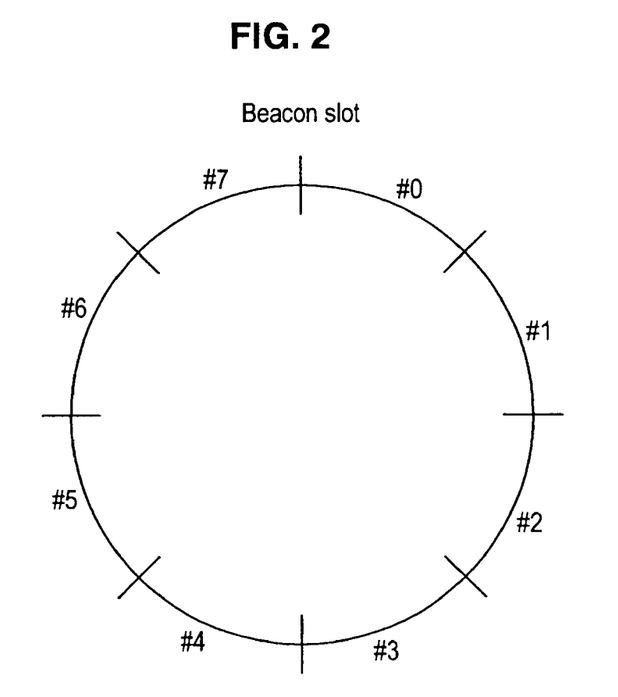
FIG. 2 is an explanatory diagram showing a flow of communication by WiMedia.

FIG. 2 is an explanatory diagram showing a flow of communication by WiMedia. According to WiMedia, the timing at which a beacon is first transmitted by the wireless communication device will be the beginning of a superframe period. Other wireless communication devices will successively acquire a beacon slot to participate in the communication. For example, when beacon slots up to #2 are used, a wireless communication device trying to join acquires beacon slot #3.

Furthermore, also with WiMedia, to deal with clock drift based on a shift of a sampling frequency, the wireless communication device matches the beacon period of itself to the beacon period longest among the peripheral devices. Furthermore, to avoid collision between beacons, the wireless communication device adds a collection list to a beacon and transmits the same.

<List of Properties>

Communication properties of Zigbee, the communication protocol defined in IEEE 802.11s and WiMedia described above will be shown below.

| Zigbee (Non-Coordinator) | |
| --- | --- |
| Communication Range | 30 m |
| Bit Rate | 250 kbps |
| Power Consumption | 50 mW |
| Others | Capable of transmission up to several undreds of metres away by multi-hop |

| Zigbee (Coordinator) | |
| --- | --- |
| Communication Range | 1 km |
| Bit Rate | 250 kbps |
| Power Consumption | 80 mW |
| Others | Capable of transmission up to several tens of metres away by multi-hop |

| IEEE 802.11s | |
| --- | --- |
| Communication Range | 100 m |
| Bit Rate | 5 Mbps |
| Power Consumption | 1 W |
| Others | Capable of transmission up to several hundreds of metres away by multi-hop |

| WiMedia | |
| --- | --- |
| Communication Range | 5 m |
| Bit Rate | 100 Mbps |
| Power Consumption | 200 mW |
| Others | Capable of transmission up to several tens of metres away by multi-hop |

2. BACKGROUND

Subsequently, background of the present embodiment will be described below.

In the USA, discussions relating to efficient use of TV frequency band (less used frequency band: White space) are vigorously conducted in view of the shift from analog TV broadcasting to digital TV broadcasting. Furthermore, in view of the complete shift to digital TV broadcasting in the USA, IEEE 802.22 standard is developed for using, for a broadband connection services, frequencies of TV channels not used in regions where there are not many broadcasting channels.

Secondary use of radio wave as described is being developed as a standard called Dynamic Spectrum Access by ITUR-WP5A and IEEE SCC41 as a technology for extending to other than TV frequency bands. This is because there are not enough frequencies to satisfy the communication needs.

Furthermore, a revision of legal rules or realization of standardized technologies is currently desired for realizing, along with flexible utilization of a spectrum among a plurality of wireless communication systems, an effective use of White space (low utilization rate of a wideband spectrum in urban areas is considered a problem).

The above described subjects to be considered are themes collectively called Cognitive radio. Realization of Cognitive radio allows a network and a terminal to optimize End to End efficiency while selecting an adaptively optimum configuration in relation to communication cost, resources and communication channel environment.

At the time of the secondary use of a spectrum, considering the problems such as so-called hidden terminal, shadowing and the like, it is desirable for a plurality of wireless communication devices to perform spectrum detection and exchange with each other sensing information obtained as a result of the spectrum detection. However, a sufficient consideration has not been given as to which communication protocol is to be selected to exchange the sensing information, for a case where each of the plurality of wireless communication devices belongs to a separate communication system operating on a certain communication protocol.

Thus, the wireless communication method according to the present embodiment has been devised in light of the foregoing circumstances. According to the wireless communication method according to the present embodiment, the sensing information of a plurality of wireless communication devices can be exchanged among the plurality of wireless communication devices by selectively using a communication protocol among a plurality of communication protocols. In the following, the present embodiment will be described in detail.

3. OVERALL CONFIGURATION OF PRESENT EMBODIMENT

Figure 3:
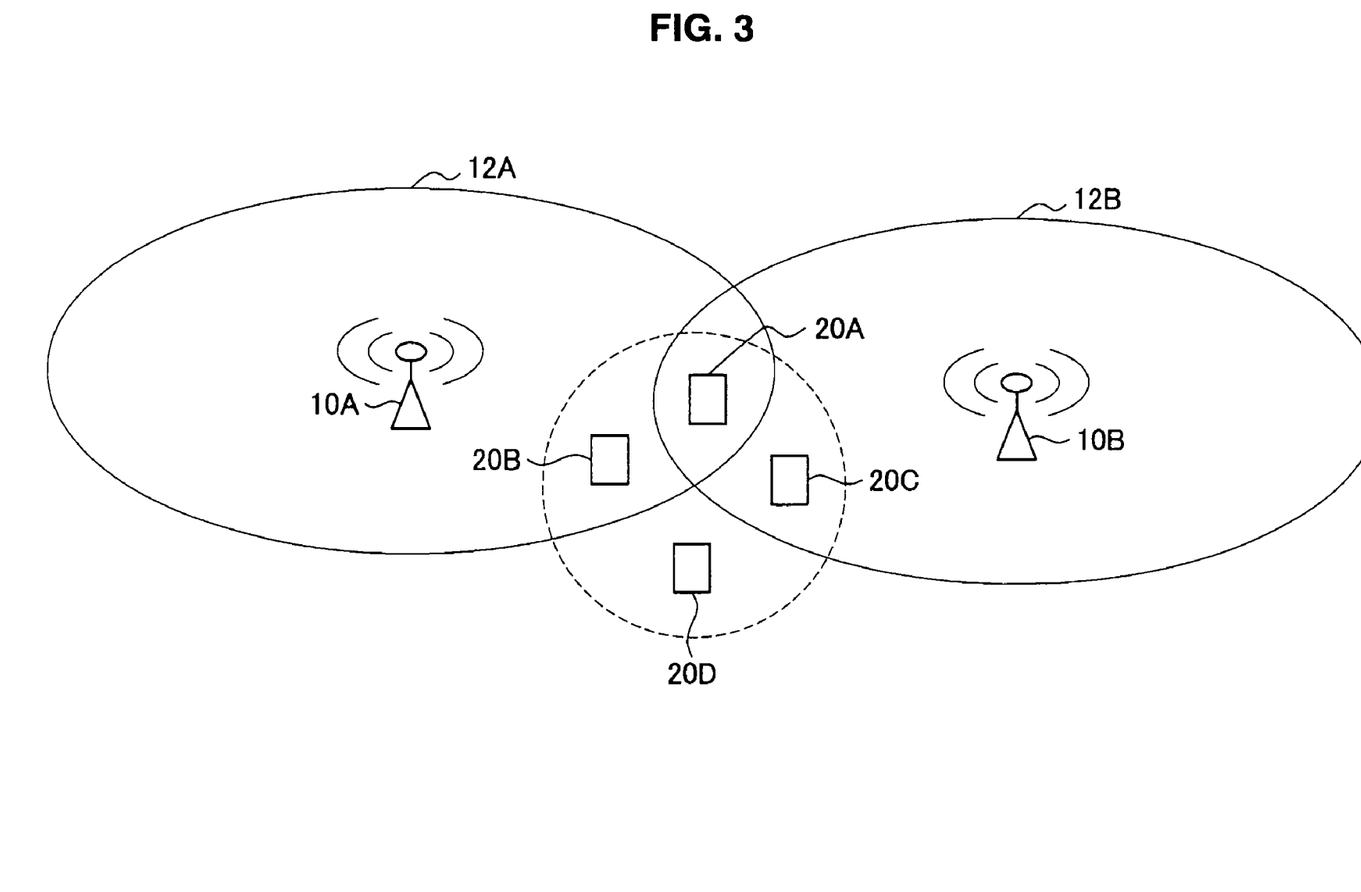
FIG. 3 is an explanatory diagram showing an overall configuration of a present embodiment.

FIG. 3 is an explanatory diagram showing the overall configuration of the present embodiment. As shown in FIG. 3, a radio wave reachable area 12A of a base station 10A includes wireless communication devices 20A and 20B, and a radio wave reachable area 12B of a base station 10B includes wireless communication devices 20A and 20C. Furthermore, a wireless communication device 20D exists outside both the radio wave reachable area 12A of the base station 10A and the radio wave reachable area 12B of the base station 10B.

Moreover, in this specification, each of a plurality of structural elements having a substantially same function will be distinguished from each other by adding a different alphabet letter to a same numeral. However, where there is no particular need to distinguish a plurality of structural elements having a same function from each other, only a same numeral will be added thereto. For example, where there is no particular need to distinguish the wireless communication devices 20A and 20B, they will be simply collectively referred to as the wireless communication devices 20.

The base station 10A is a base station of a communication system (hereinafter referred to as "communication system A") operating on a certain communication protocol, and controls wireless communication by a wireless communication device 20 existing in the radio wave reachable area 12A. Similarly, the base station 10B is a base station of a communication system (hereinafter referred to as "communication system B") operating on a certain communication protocol, and controls wireless communication by a wireless communication device 20 existing in the radio wave reachable area 12B.

Moreover, a certain communication protocol may be a communication protocol defined in IEEE 802.11, Worldwide Interoperability for Microwave Access (WiMAX) defined in IEEE 802.16, Zigbee, or the like.

Since the wireless communication device 20A is included in both the radio wave reachable area 12A of the base station 10A and the radio wave reachable area 12B of the base station 10B, it can receive both beacon transmitted from the base station 10A and beacon transmitted from the base station 10B. Here, sensing information indicating the state of each communication systems is included in the beacons, and thus the wireless communication device 20A is aware of the state of both communication system A and communication system B.

The wireless communication device 20 may be an information processing apparatus such as a personal computer (PC), a household image processing device (a DVD recorder, a video recorder or the like) or a personal digital assistant (PDA). Furthermore, the wireless communication device 20 may be an information processing apparatus such as a mobile phone, a Personal Handyphone System (PHS), a portable music playback device, a portable image processing device, a portable game machine, a home game machine or an electrical household appliance.

On the other hand, although the wireless communication device 20B is aware of the state of the communication system A because it is included in the radio wave reachable area 12A of the base station 10A, it is not aware of the state of the communication system B because it is not included in the radio wave reachable area 12B of the base station 10B.

In a similar manner, although the wireless communication device 20C is aware of the state of the communication system B because it is included in the radio wave reachable area 12B of the base station 10B, it is not aware of the state of the communication system A because it is not included in the radio wave reachable area 12A of the base station 10A.

Furthermore, the wireless communication device 20D is not aware of either the state of the communication system A or of the communication system B because it exists outside both the radio wave reachable area 12A of the base station 10A and the radio wave reachable area 12B of the base station 10B.

In the state shown in FIG. 3, the wireless communication devices 20A to 20D exchanges, among them, the sensing information each of the wireless communication devices 20 possesses to perform communication while secondarily using a spectrum. Here, if a spectrum is secondarily used based only on the sensing information possessed by one wireless communication device 20, for example, the wireless communication device 20B, the state of the communication system B will not be taken into account. Accordingly, exchanging the sensing information as described above is effective. In the following, a configuration of the wireless communication device 20 which selects and changes a communication protocol for exchanging the sensing information will be described with reference to FIGS. 4 and 5.

4. CONFIGURATION OF WIRELESS COMMUNICATION DEVICE ACCORDING TO PRESENT EMBODIMENT

Figure 4:
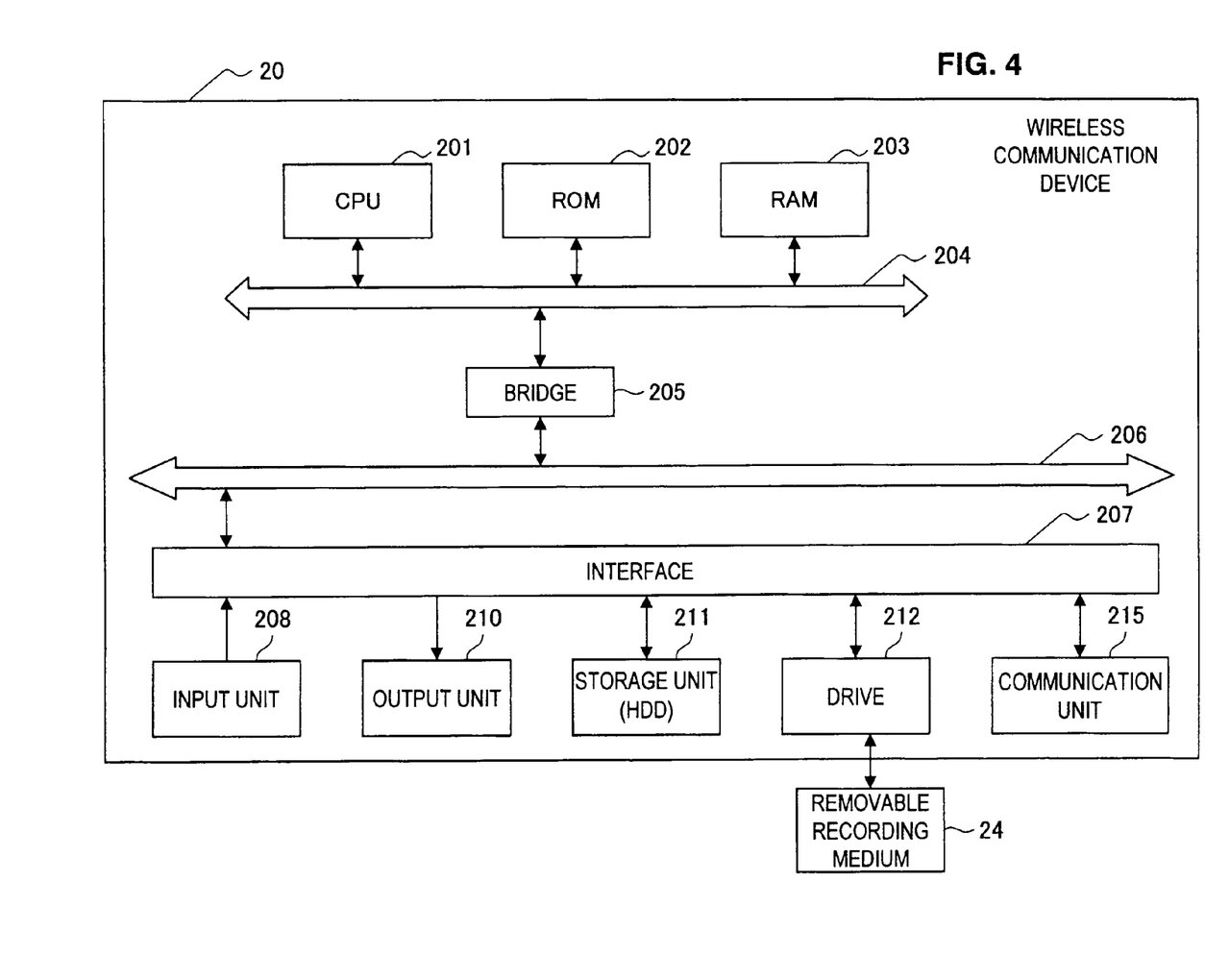
FIG. 4 is a block diagram showing a hardware configuration of a wireless communication device.

FIG. 4 is a block diagram showing a hardware configuration of the wireless communication device 20. The wireless communication device 20 includes a central processing unit (CPU) 201, a read only memory (ROM) 202, a random access memory (RAM) 203 and a host bus 204. Furthermore, the wireless communication device 20 includes a bridge 205, an external bus 206, an interface 207, an input unit 208, an output unit 210, a storage unit (HDD) 211, a drive 212 and a communication unit 215.

The CPU 201 functions as an arithmetic operation processing section and a control section, and controls the entire operations of the wireless communication device 20 according to various programs. Furthermore, the CPU 201 may be a microprocessor. The ROM 202 stores programs, arithmetic operation parameters or the like to be used by the CPU 201. The RAM 203 temporarily stores a program to be used by the CPU 201 in its execution, parameters that change appropriately in the execution, or the like. These are interconnected through the host bus 204 configured from a CPU bus or the like.

The host bus 204 is connected to the external bus 206 such as a peripheral component interconnect/interface (PCI) bus through the bridge 205. Moreover, the host bus 204, the bridge 205 and the external bus 206 do not necessarily have to be configured separately, and the functions may be implemented in a single bus.

The input unit 208 is configured from, for example, an input section for a user to input information, such as a mouse, a keyboard, a touch panel, a button, a microphone, a switch or a lever, and an input control circuit for generating an input signal based on an input by the user and for outputting the input signal to the CPU 201. The user of the wireless communication device 20 can input various types of data to the wireless communication device 20 or issue an instruction for a processing operation by operating this input unit 208.

The output unit 210 includes, for example, a display device such as a cathode ray tube (CRT) display device, a liquid crystal display (LCD) device, an organic light emitting diode (OLED) device, or a lamp. Furthermore, the output unit 210 includes an audio output device such as a speaker, a head phone, or the like. The output unit 210 outputs reproduced content, for example. Specifically, the display device displays various types of information of reproduced image data or the like in the form of text or image. On the other hand, the audio output device converts reproduced audio data or the like to sound and outputs the sound.

The storage unit 211 is a data storage device configured as an example of the storage section of the wireless communication device 20 according to the present embodiment. The storage unit 211 may include a storage medium, a recording unit for recording data on the storage medium, a read unit for reading data out of the storage medium, a deletion unit for deleting data recorded on the storage medium, or the like. The storage unit 211 drives a hard disk, and stores programs to be executed by the CPU 201 and various types of data.

Moreover, the storage unit 211 may be a storage medium such as a non-volatile memory, a magnetic disk, an optical disk, a magneto optical (MO) disk, or the like. The non-volatile memory may be, for example, an electrically erasable programmable read-only memory (EEPROM) or an erasable programmable ROM (EPROM). Furthermore, the magnetic disk may be a hard disk, a discoid magnetic disk, or the like. Furthermore, the optical disk may be a compact disc (CD), a digital versatile disc recordable (DVD-R), a Blu-Ray (BD (registered trademark)) disc, or the like.

The drive 212 is a reader/writer for the storage medium, and is built in or externally attached to the wireless communication device 20. The drive 212 reads out information stored in an attached removable recording medium 24 such as a magnetic disk, an optical disk, a magneto-optical disk, a semiconductor memory or the like and outputs the information to the RAM 203.

The communication unit 215 is a communication interface configured from a communication device or the like for connecting to other wireless communication device 20 or the base station 10. For example, the communication unit 215 transmits/receives a beacon to/from the base station 10 or transmits/receives the sensing information to/from other wireless communication device 20.

Figure 5:
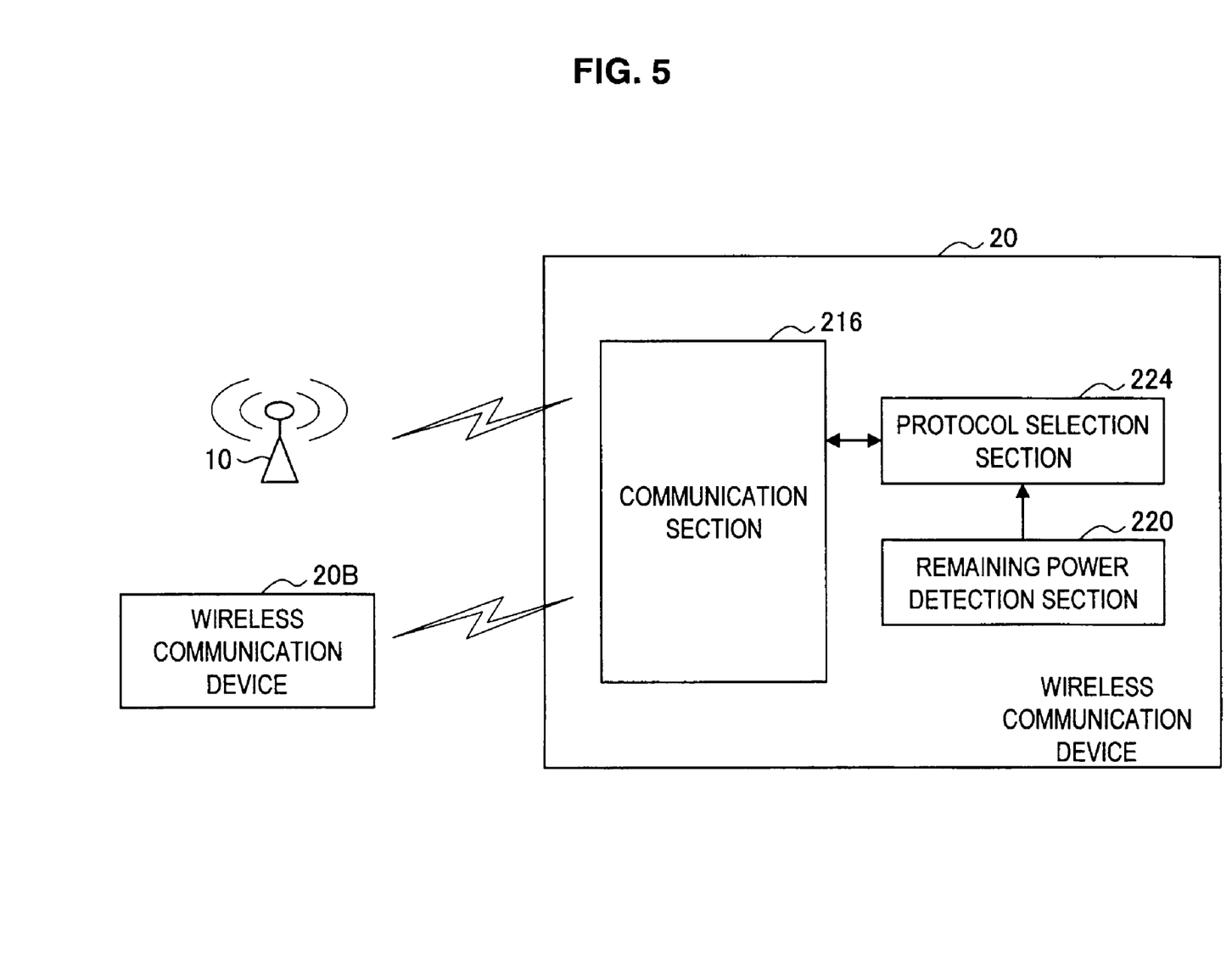
FIG. 5 is a functional block diagram showing a configuration of the wireless communication device.

FIG. 5 is a functional block diagram showing a configuration of the wireless communication device 20. As shown in FIG. 5, the wireless communication device 20 includes a communication section 216, a remaining power detection section 220 and a protocol selection section 224.

The communication section 216 receives a beacon transmitted from the base station 10. Here, the beacon includes sensing information indicating the state (radio wave environment, cost, traffic, delay, and the like) of a communication system managed by the base station 10 and capability information. The capability information is information indicating a communication protocol with which each wireless communication device 20 in the communication system managed by the base station 10 is compatible.

Furthermore, the communication section 216 may also communicate with other wireless communication device 20 (the wireless communication device 20B is shown as an example in FIG. 5) by using a protocol selected by the protocol selection section 224.

The remaining power detection section 220 detects the remaining amount of power that the wireless communication device 20 can use for wireless communication.

The protocol selection section 224 selects a communication protocol from among a plurality of communication protocols at the time of starting the exchange of the sensing information. Furthermore, the protocol selection section 224 changes the communication protocol as appropriate after exchanging the sensing information.

Here, as described in "<1. Concrete Example of Communication Protocol>," properties such as power consumption, bit rate, or the like, is different for each communication protocol. Accordingly, the protocol selection section 224 selects or changes the communication protocol according to the state of the self device or the peripheral state.

For example, the protocol selection section 224 may select a communication protocol according to which the power consumption is lower as the remaining power detected by the remaining power detection section 220 is less. Specifically, as described in "<1. Concrete Example of Communication Protocol>," power consumption of the hierarchical management communication protocol such as Zigbee is comparatively low, and thus the protocol selection section 224 may select the hierarchical management communication protocol when the remaining power is below a predetermined value.

Furthermore, when immediacy of response to a change in a network configuration is required, or when the immediacy is important, the protocol selection section 224 may select the autonomous decentralized communication protocol such as WiMedia.

Furthermore, the protocol selection section 224 may select the hierarchical management communication protocol when density of a plurality of wireless communication devices 20 in a network where information is to be exchanged is higher than a predetermined value, and may select the autonomous decentralized communication protocol when the density is lower than the predetermined value.

Furthermore, the protocol selection section 224 may change the hierarchical management communication protocol to the autonomous decentralized communication protocol when a reference value of a response to a change in a network configuration is exceeded.

Moreover, although examples where the protocol selection section 224 selects or changes the communication protocol based on the remaining power, immediacy of response to a change in a network configuration, or the like, have been described above, the present invention is not limited to such an example. For example, the protocol selection section 224 may select or change the communication protocol based on the size, reliability, bit rate at the time of information exchange, or the like, of a network configured from wireless communication devices 20 to which a secondary service is to be provided.

5. OPERATION OF PRESENT EMBODIMENT

Next, with reference to FIGS. 6 and 7, a flow of an operation of the present embodiment will be described.

Figure 6:
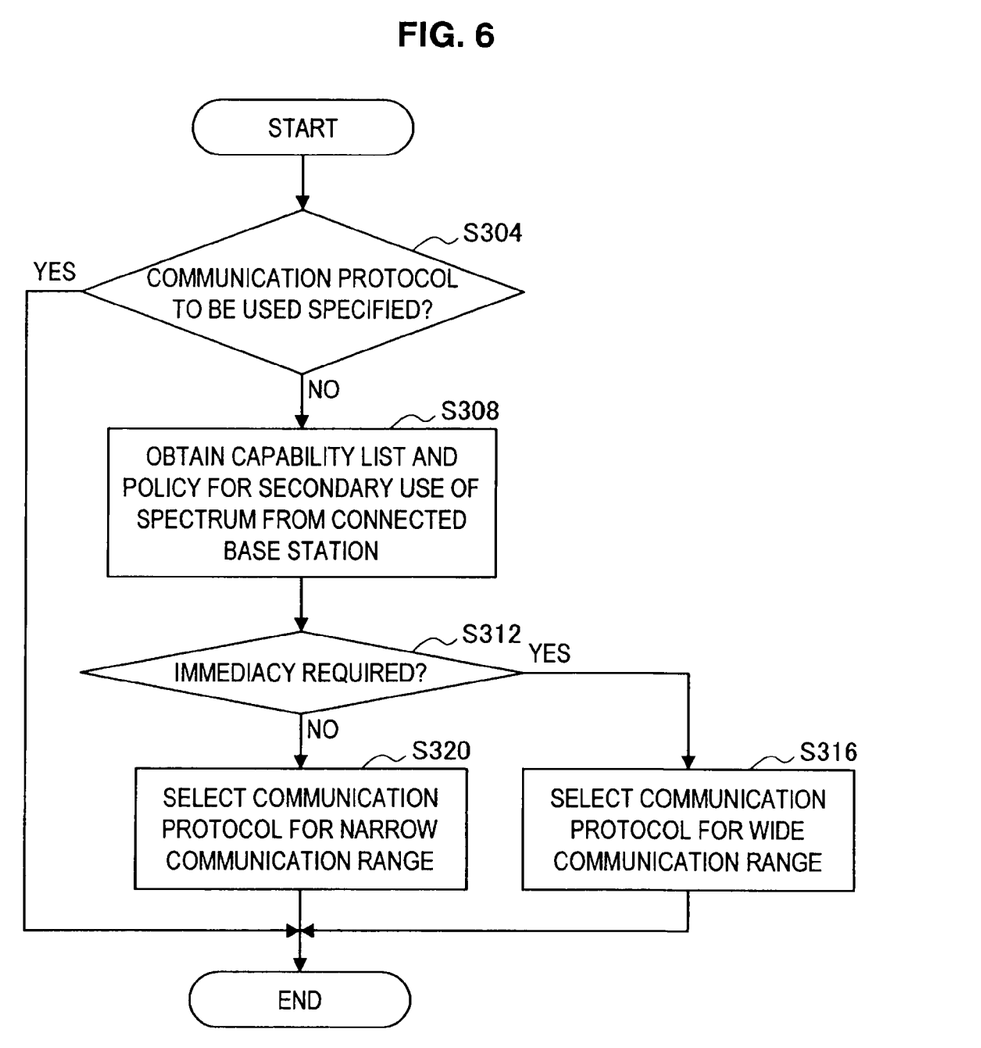
FIG. 6 is a flow chart showing a flow of an operation of the wireless communication device.

FIG. 6 is a flow chart showing a flow of an operation of the wireless communication device 20. As shown in FIG. 6, when a communication protocol to be used is not specified (S304), a capability list of peripheral terminals and a policy for secondary use of a spectrum are obtained from a base station (possibly a virtual base station) 10 that is connected (S308).

Then, in case immediacy is required for the start of secondary service, the protocol selection section 224 selects a communication protocol for wide communication range from the capability list relating to the peripheral terminals (S316), and in other cases, selects a communication protocol for narrow communication range (S320).

Moreover, when a communication protocol to be used is specified (S304), the protocol selection section 224 selects the communication protocol. For example, when use of the hierarchical management communication protocol is specified, the hierarchical management communication protocol is unconditionally selected, and when use of the autonomous decentralized communication protocol is specified, the autonomous decentralized communication protocol is unconditionally selected.

Figure 7:
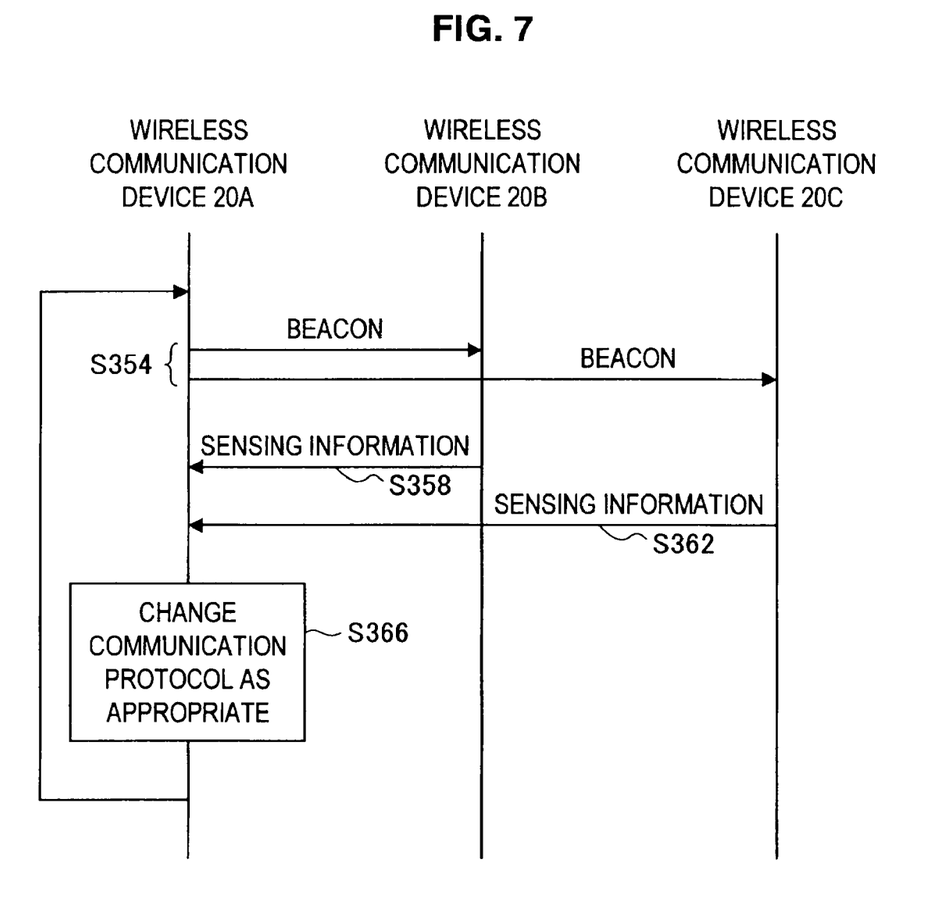
FIG. 7 is a sequence diagram showing a flow of exchange of sensing information after a communication protocol is selected by the wireless communication device.

FIG. 7 is a sequence diagram showing a flow of the exchange of the sensing information after a communication protocol is selected by the wireless communication device 20A. Moreover, in FIG. 7, an example is shown where the wireless communication device 20A selects the hierarchical management communication protocol, and the wireless communication device 20A functions as a coordinator.

First, as shown in FIG. 7, the wireless communication device 20A transmits a beacon by using the selected hierarchical management communication protocol (S354). Then, the wireless communication device 20B that received the beacon transmits sensing information that it possesses to the wireless communication device 20A (S358). Here, the sensing information may include information indicating whether or not the wireless communication device 20B will participate in communication by the secondary use of a spectrum.

Moreover, a case of searching for a coordinator in the periphery and sharing the sensing information has been described above. However, as another method, it is also possible to select a method where the hierarchical management communication protocol is used first, and when a coordinator is not found, the autonomous decentralized communication protocol is used. Or, a method can be selected where the autonomous decentralized communication protocol is used from the start and sharing of the sensing information with peripheral terminals is attempted.

In a similar manner, the wireless communication device 20C that received a beacon from the wireless communication device 20A transmits sensing information that it possesses to the wireless communication device 20A (S362). Then, the protocol selection section 224 of the wireless communication device 20A changes the communication protocol as appropriate based on the remaining power of the self device or the sensing information received from the wireless communication devices 20B and 20C, or the like (S366). Then, the processes from S354 are repeated.

Moreover, in relation to S366, when change from the autonomous decentralized communication protocol to the hierarchical management communication protocol is requested by a certain wireless communication device 20, peripheral devices working in cooperation with each other or the wireless communication device 20 that issued the request for change working alone may check whether or not a peripheral device acting as a virtual base station or as a virtual access point exists, and when the peripheral device exists, may negotiate with the peripheral device to be a coordinator in its connection form, and if accepted, may shift to the hierarchical management communication protocol.

Furthermore, when a plurality of peripheral devices acting as virtual base stations or as virtual access points exist, a peripheral device capable of connecting to as many different base stations or access points as possible may be made to be a candidate for the coordinator in its connection form.

On the other hand, when the peripheral device acting as a virtual base station or as a virtual access point does not exist, a peripheral device to be the candidate may be searched for or the candidate for the coordinator may be selected by an arbitrary selection measure and a negotiation may be conducted between each other for the candidate to be the coordinator, and if permission is obtained, the communication protocol may be shifted to the hierarchical management communication protocol.

6. OTHER APPLICATION EXAMPLES OF PRESENT EMBODIMENT

Next, other application examples of the present embodiment will be described with reference to FIGS. 8 to 11.

Figure 8:
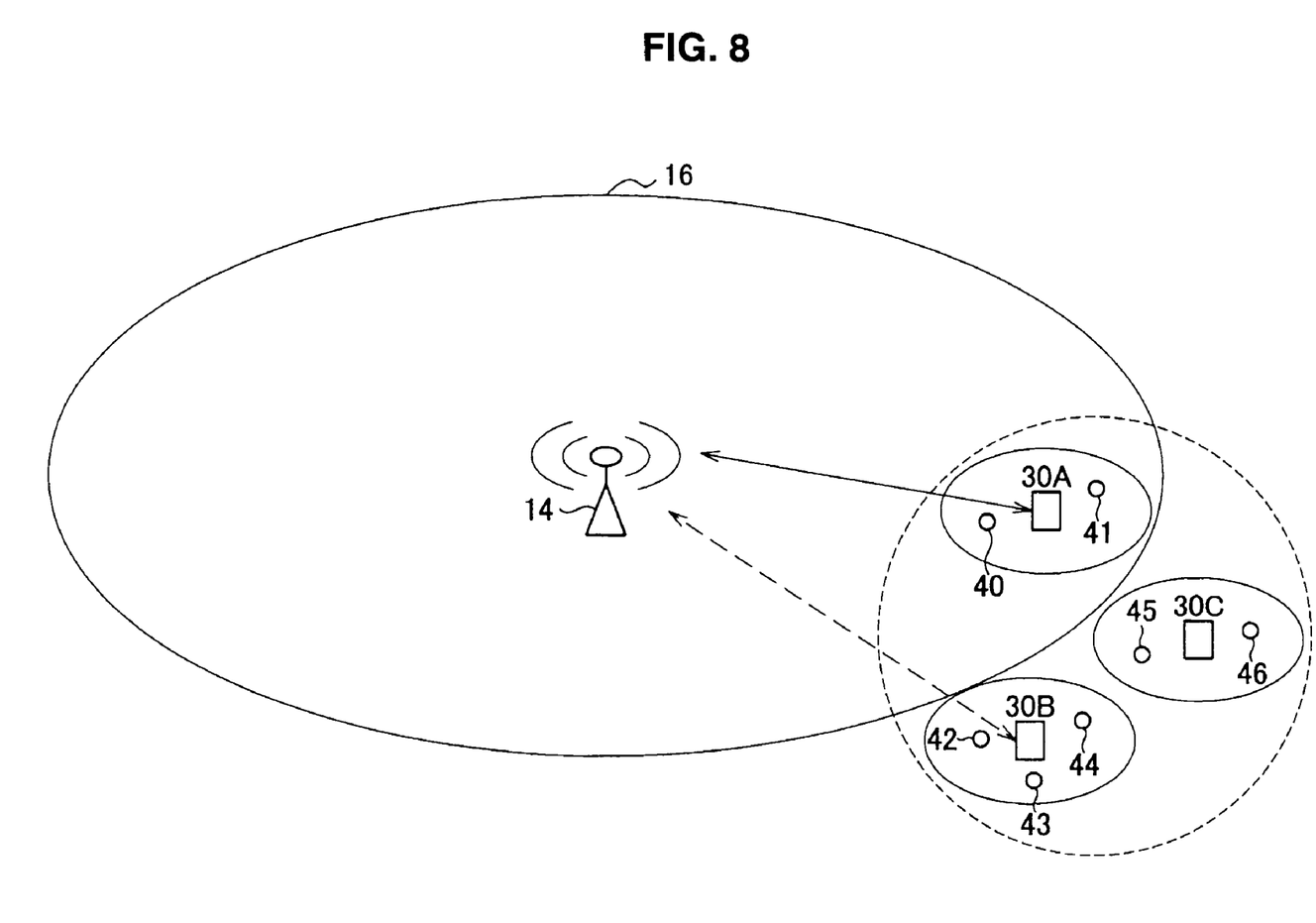
FIG. 8 is an explanatory diagram showing another application example of the present embodiment.

FIG. 8 is an explanatory diagram showing another application example of the present embodiment. The present embodiment can also be applied to a telecommunications system as shown in FIG. 8 where a relay device 30 relays the communication between a cellular base station 14 and a telephone terminal 40.

Moreover, in the example shown in FIG. 8, a relay device 30A relays the communication by the telephone terminals 40 and 41, a relay terminal 30B relays the communication by telephone terminals 42 to 44, and a relay device 30C relays the communication by telephone terminals 45 and 46. In this telecommunications system, the relay device 30 has a function equivalent to that of the above-described wireless communication device 20.

Specifically, since the relay device 30A is included in a radio wave reachable area 16 of the cellular base station 14, it can grasp, based on information transmitted from the cellular base station 14, the status of the telecommunications system managed by the cellular base station 14.

On the other hand, since the relay devices 30B and 30C are not included in the radio wave reachable area 16 of the cellular base station 14, they are not able to grasp the status of the telecommunications system managed by the cellular base station 14.

Accordingly, the relay device 30A, for example, may select a communication protocol (for example, the autonomous decentralized communication protocol), and the status of the telecommunications system known to each of the wireless communication devices 30A to 30C may be exchanged among them by using the communication protocol. As a result, the relay devices 30B and 30C are enabled to grasp the status of the telecommunications system managed by the cellular base station 14, and to optimize the power, bit rate, directivity, or the like, at the time of relaying.

Figure 9:
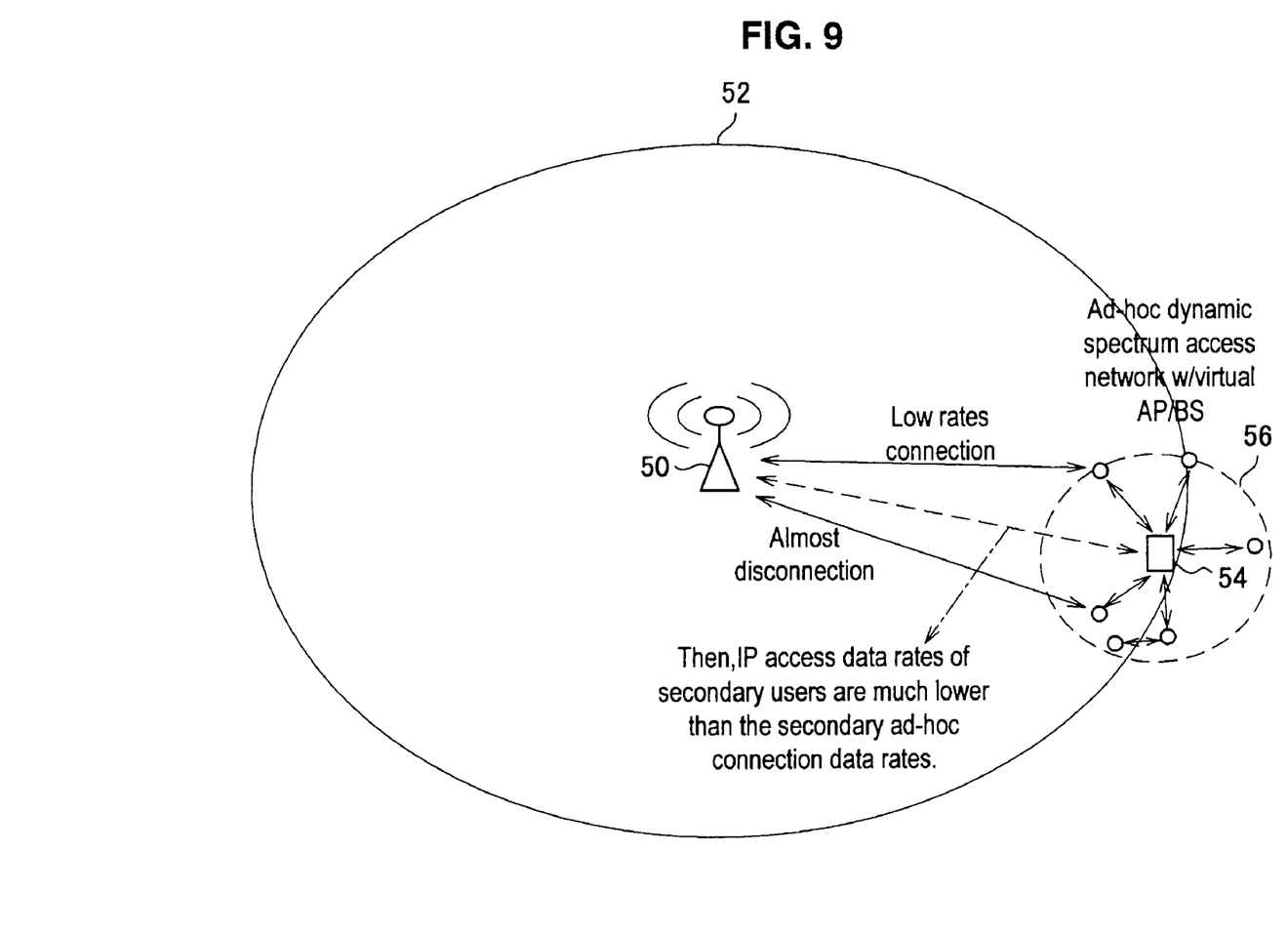
FIG. 9 is an explanatory diagram showing another application example of the present embodiment.

FIG. 9 shows an example where a virtual access point or a virtual base station 54 located in a primary service area 52 acts as a coordinator of a secondary service area 56. More specifically, when an arbitrary terminal A among terminals shown as circles within the secondary service area 56 desires to perform IP connection (connection to an outside network), the virtual access point or the virtual base station 54 mediates, as a repeater, the IP connection by the terminal A to a base station 50.

Furthermore, the base station 50 is capable of informing the virtual access point or the virtual base station 54 of the status of a peripheral primary use terminal (information such as a terminal being in the periphery of the secondary service area 56). Accordingly, the virtual access point or the virtual base station 54 which received the information performs control prompting transmission power control, directivity control, or the like, of a terminal group within the secondary service area 56, and structures a secondary service while preventing interference with a primary service.

Figure 10:
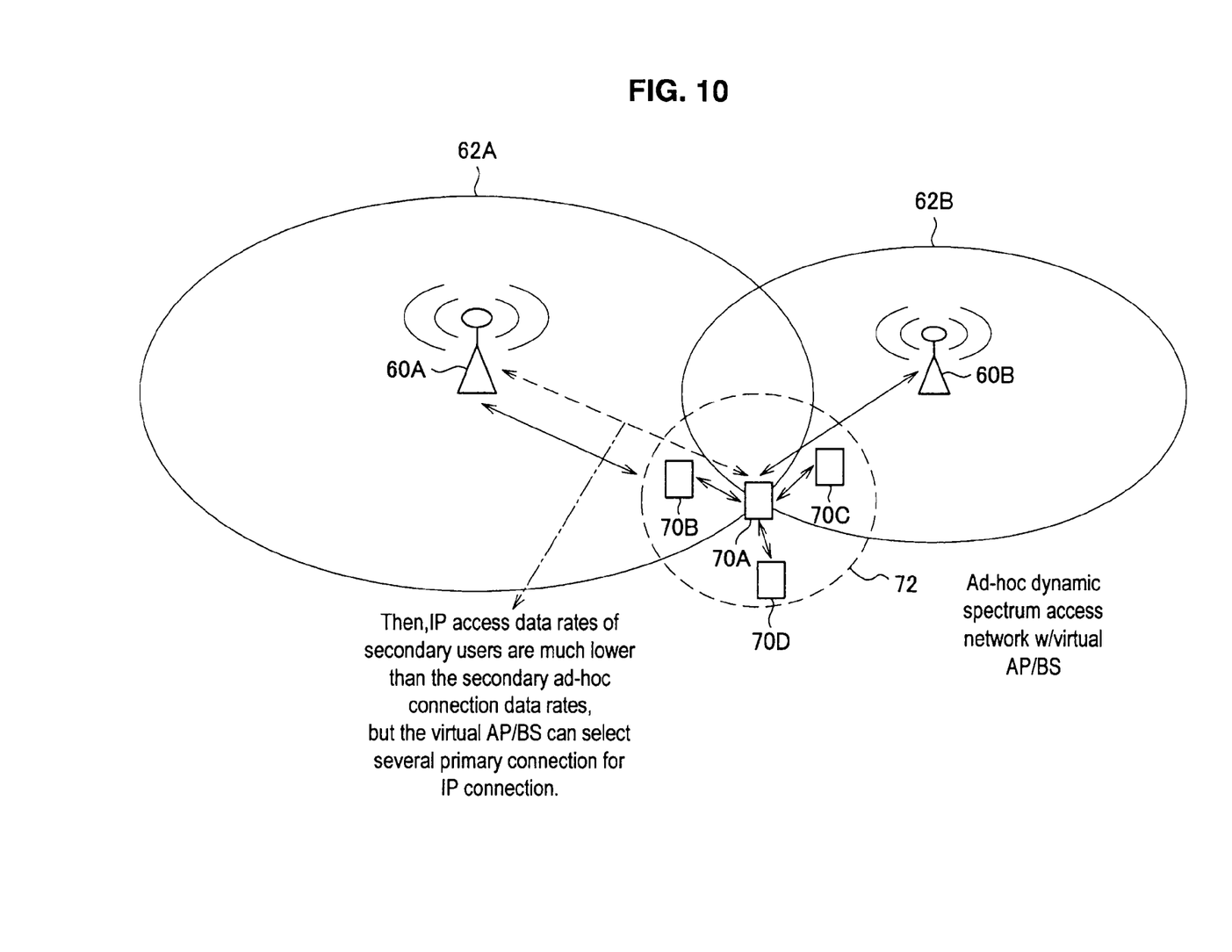
FIG. 10 is an explanatory diagram showing another application example of the present embodiment.

FIG. 10 shows an example where a virtual access point or a virtual base station 70A located within primary service areas 62A and 62B and dealing with a plurality of communication systems acts as a coordinator of a secondary service area 72. More specifically, when a terminal A (any one of 70B to 70D) within the secondary service area 72 desires to perform IP connection, the virtual access point or the virtual base station 70A mediates, as a repeater, the IP connection by the terminal A to base stations 60A and 60B for a primary service.

Furthermore, since the virtual access point or the virtual base station 70A deals with a plurality of communication systems, it can select, between the base stations 60A and 60B, a base station for a primary service by monitoring communication quality and based on a criteria such as which communication system's communication quality is better.

In addition, the base stations 60A and 60B are capable of informing the virtual access point or the virtual base station 70A of the status of a peripheral primary use terminal (information such as a terminal being in the periphery of the secondary service area 72). Accordingly, the virtual access point or the virtual base station 70A which received the information performs control prompting transmission power control, directivity control, or the like, of a terminal group within the secondary service area 72, and structures a secondary service while preventing interference with a primary service.

Figure 11:
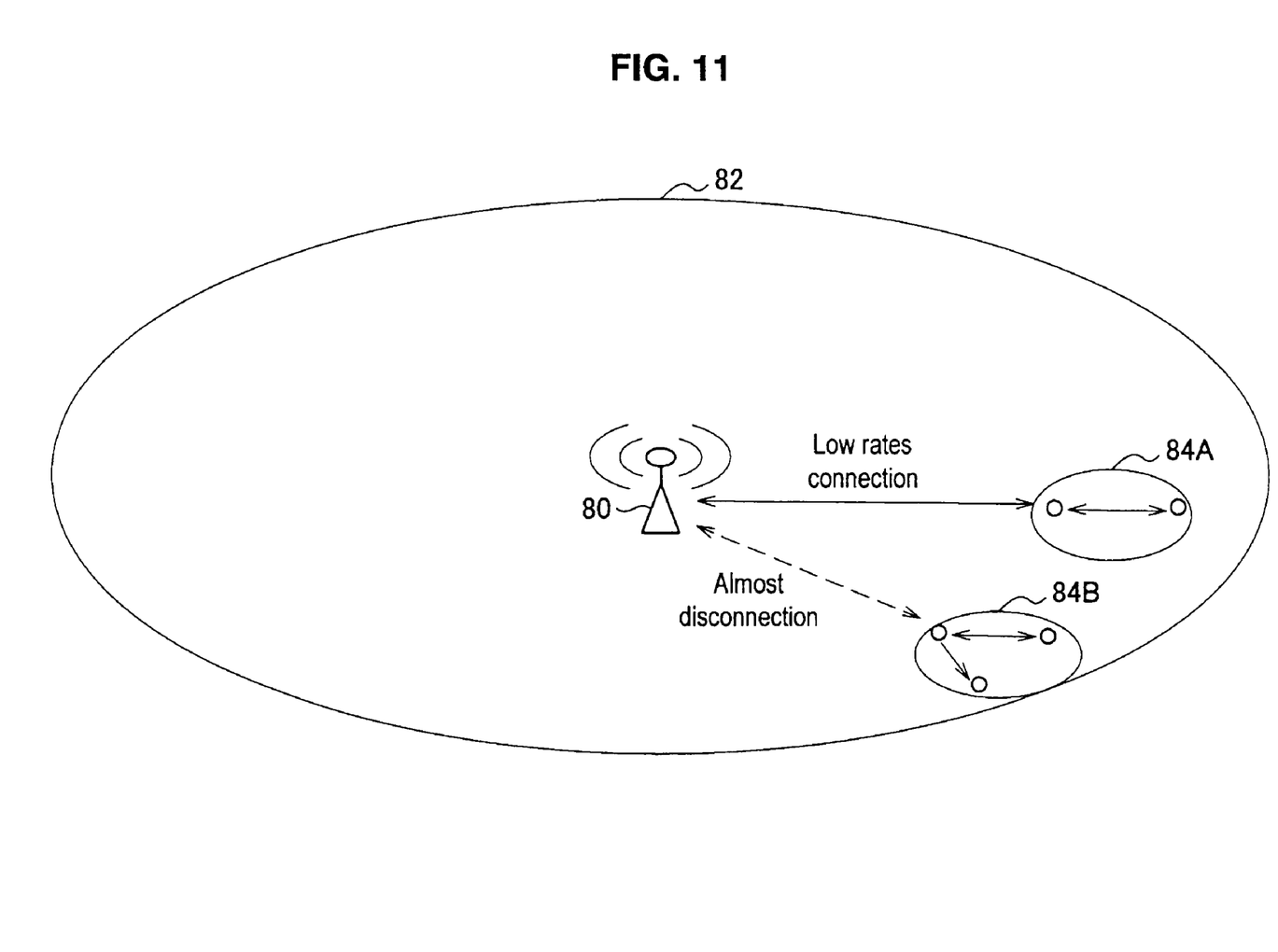
FIG. 11 is an explanatory diagram showing another application example of the present embodiment.

In the example shown in FIG. 11, a terminal which is within a primary service area 82 and which is located at a position at which a reception power (Pp) for a primary service is sufficiently small performs secondary services 84A and 84B by using autonomous decentralized communication (ad-hoc communication). A terminal performing secondary use performs the autonomous decentralized communication with the transmission power (Ps) within the limit of not affecting a peripheral terminal performing the primary use. At this time, although Pp is larger than Ps, directivity control and power control are regularly performed by a base station 80 by using a communication measure of the primary service in such a way as to not affect a peripheral terminal performing the primary service.

7. CONCLUSION AND SUPPLEMENT

As described above, according to the present embodiment, the sensing information of a plurality of wireless communication devices can be exchanged among the plurality of wireless communication devices by selectively using a communication protocol from a plurality of communication protocols.

It should be understood by those skilled in the art that various modifications, combinations, sub-combinations and alterations may occur depending on design requirements and other factors insofar as they are within the scope of the appended claims or the equivalents thereof.

For example, a plurality of wireless communication devices 20 may exchange the above-described sensing information among them while performing communication in a communication system to which each of the wireless communication devices 20 belongs.

Furthermore, when a wireless communication device 20 acting as a virtual base station or as a virtual access point is permitted a secondary use of a spectrum by an operator of the primary use of the spectrum or when it is decided that the wireless communication device 20 is in a communication environment satisfying a predetermined rule for a spectrum secondary use, the wireless communication device 20 may autonomously act as a coordinator, control the transmission power and directivity of a peripheral device to which communication connection is possible so as not to interfere with peripheral primary users, and perform the secondary service in the spectrum.

Furthermore, when a plurality of peripheral devices acting as virtual base stations or as virtual access points exist, the plurality of peripheral devices may inform each other of the using status of a peripheral spectrum, control the transmission power and directivity of a peripheral device (a peripheral wireless communication device 20 to which communication connection is possible) performing a secondary use of the spectrum, and perform the secondary service in the spectrum in such a way as not to interfere with peripheral primary users.

Furthermore, in case there is a request from a wireless communication device 20 within the primary service area of a spectrum to temporarily perform within the network area autonomous decentralized communication with a peripheral terminal, when a wireless communication device 20 acting as a virtual base station or as a virtual access point is permitted a secondary use of a spectrum by an operator of the primary use of the spectrum or when it is decided that the wireless communication device 20 is in a communication environment satisfying a predetermined rule for a spectrum secondary use, the wireless communication device 20 may determine a communication protocol based on the capability of the peripheral terminal with which the autonomous decentralized communication is desired to be performed, obtain information of a peripheral terminal from the primary operator of the spectrum, control the transmission power and directivity in such a way as not to interfere with peripheral primary users, and perform the secondary service in the spectrum. The rule for the secondary use of a spectrum is only for preventing interference with the peripheral primary users, and a case is included where, although spectrum intensity (Pp) from a primary service is low but the spectrum is receivable, a secondary service is performed using transmission power (Ps) with intensity higher than Pp.

For example, each of the steps in the processing in the wireless communication method in this specification does not necessarily have to be performed chronologically in the order shown in the sequence diagram or the flow chart. For example, each of the steps in the processing in the wireless communication method may include processing in parallel or as individual steps (for example, parallel processing or object processing).

Furthermore, a computer program may also be provided that directs hardware such as the CPU 201, the ROM 202, the RAM 203 and the like built into the wireless communication device 20 to fulfill functions corresponding to each of the structural elements of the wireless communication device 20 described above. Furthermore, a storage medium on which the computer program is stored is also provided. Furthermore, a series of processes may be performed by hardware by configuring each of the functional blocks shown in the functional block diagram in FIG. 5 as hardware.

The present application contains subject matter related to that disclosed in Japanese Priority Patent Application JP 2008-264566 filed in the Japan Patent Office on 10 Oct. 2008, the entire content of which is hereby incorporated by reference.

What is claimed is:

1. A wireless communication method comprising the steps of:
   selecting, by a wireless communication device belonging to a communication system operating on a certain communication protocol, a first communication protocol among a plurality of communication protocols;
   communicating, among a plurality of wireless communication devices including the wireless communication device, information including peripheral communication status of each wireless communication device by using the first communication protocol;
   changing, based on the information, the first communication protocol to a second communication protocol to be used for communicating the information; and
   further communicating, by the wireless communication device and based on the information, via a frequency used in the communication system operating on the certain communication protocol.

2. The wireless communication method according to claim 1, wherein the plurality of communication protocols include an autonomous decentralized communication protocol and a hierarchical management communication protocol.

3. The wireless communication method according to claim 2, wherein the autonomous decentralized communication protocol is selected as the first communication protocol when immediacy of response to a change in a network configuration is required, and the hierarchical management communication protocol is selected as the first communication protocol when immediacy of response to a change in a network configuration is not required and when a terminal acting as a coordinator exists.

4. The wireless communication method according to claim 3, wherein the second communication protocol to be used for communicating the information is the hierarchical management communication protocol when the first communication protocol used for communicating the information is the autonomous decentralized communication protocol, another terminal acting as a coordinator exists and remaining power of the wireless communication device becomes lower than a predetermined value.

5. The wireless communication method according to claim 2, wherein the autonomous decentralized communication protocol is unconditionally selected as the first communication protocol.

6. The wireless communication method according to claim 2, wherein the hierarchical management communication protocol is unconditionally selected as the first communication protocol.

7. The wireless communication method according to claim 6, wherein the second communication protocol to be used for communicating the information is the autonomous decentralized communication protocol when a terminal acting as a coordinator does not exist on the hierarchical management communication protocol.

8. The wireless communication method according to claim 2, wherein
   the second communication protocol is the hierarchical management communication protocol is selected when a density of the plurality of wireless communication devices in a network in which the information is communicated is higher than a predetermined value, and
   the second communication protocol is the autonomous decentralized communication protocol is selected when the density is less than the predetermined value.

9. The wireless communication method according to claim 2, wherein the second communication protocol to be used for communicating the information is the hierarchical management communication protocol when a terminal acting as a coordinator is detected while using the autonomous decentralized communication protocol as the first communication protocol.

10. The wireless communication method according to claim 2, wherein when change from the autonomous decentralized communication protocol to the hierarchical management communication protocol is requested by the wireless communication device, peripheral devices working in cooperation with each other or the wireless communication device that issued the request for change working alone checks whether or not a peripheral device acting as a virtual base station or as a virtual access point exists, and when the peripheral device exists, negotiates with the peripheral device to be a coordinator, and if accepted, shifts to the hierarchical management communication protocol as the second communication protocol.

11. The wireless communication method according to claim 10, wherein when a plurality of peripheral devices acting as virtual base stations or as virtual access points exist, a peripheral device capable of connecting to as many different base stations or access points as possible is made to be a candidate for the coordinator.

12. The wireless communication method according to claim 11, wherein when the peripheral device acting as a virtual base station or as a virtual access point does not exist, a peripheral device to be the candidate is searched for or the candidate for the coordinator is selected by an arbitrary selection measure and a negotiation is conducted between each other for the candidate to be the coordinator, and if permission is obtained, the communication protocol is shifted to the hierarchical management communication protocol.

13. The wireless communication device according to claim 2, wherein the autonomous decentralized communication protocol includes a communication protocol defined in WiMedia or in IEEE 802.11s, and the hierarchical management communication protocol includes Zigbee.

14. A wireless communication apparatus belonging to a communication system operating on a certain communication protocol comprising:
- a selection unit configured to select a first communication protocol among a plurality of communication protocols;
- a first communication unit configured to communicate information including peripheral communication status of each wireless communication device with at least one of other wireless communication devices belonging to the communication system by using the first communication protocol;
- a change unit configured to change, based on the information, the first communication protocol to a second communication protocol to be used for communicating the information; and
- a second communication unit configured to further communicate, based on the received information, via a frequency used in the communication system operating on the certain communication protocol.

* * * * *